United States Patent [19]

Reda

[11] 3,786,909

[45] Jan. 22, 1974

[54] PALLET COUPLING DEVICE FOR CHAIN TYPE CONVEYORS

[75] Inventor: Glauco Reda, Milano, Italy

[73] Assignee: Officina Tecnomeccanica Esecuzioni e Montaggi S.p.A. (O.T.E.M.), Milano, Italy

[22] Filed: June 26, 1972

[21] Appl. No.: 266,228

[30] Foreign Application Priority Data
Feb. 4, 1972 Italy................................ 20202 A/72

[52] U.S. Cl. ............................................. 198/131
[51] Int. Cl............................................. B65g 17/00
[58] Field of Search 198/131, 171; 104/172 B, 172 C, 104/172 BT

[56] References Cited
UNITED STATES PATENTS
3,587,829  6/1971  Sorensen............................ 198/131
3,675,759  7/1972  Koppe................................ 198/131

Primary Examiner—Evon C. Blunk
Assistant Examiner—Joseph E. Valenza
Attorney, Agent, or Firm—I. Irving Silverman et al.

[57] ABSTRACT

A pallet coupling device for chain type conveyors including a body and a support pin journaled therein and constrained axially relative thereto. The support pin is insertable within the hollow roller of said conveyor chain for rotation therein. The body has a pair of offset passageways, one for receiving said support pin and the second having its long axis normal to the first for receiving a pallet dog or holder pin. A pair of parallel sockets are provided in the body arranged normal to said passageway pair and respectively intercepting each of said passageways. Spring biased spindles or plungers are received within said respective sockets with their free ends biased in engagement with annular grooves provided on said support pin and said pallet holder pin respectively. Actuators are provided for operating each of said plungers independently. An outwardly extending projection or peg is provided for engagement upon the link of the chain.

15 Claims, 3 Drawing Figures

PATENTED JAN 22 1974　　3,786,909

PALLET COUPLING DEVICE FOR CHAIN TYPE CONVEYORS

FIELD OF THE INVENTION

This invention relates generally to the chain type conveyor apparatus such as used, for example, in wrapping machinery for merchandise. More particularly, the invention is concerned with the provision of an attachment device for mounting a pallet to a chain type conveyor whereby the pallet may be removably mounted to the conveyor and, the attachment device likewise may be easily mounted on or dismounted from the conveyor.

BACKGROUND OF THE INVENTION

In chain type conveyors such as those utilized for goods wrapping machinery, devices for attaching a pallet to a chain conveyor are often referred to as "catch pins." As known, catch pin devices often require complex connection means so that they can ride with the conveyor chain even as the latter moves on its return path around the sprocket wheels, for example. Known catch pin devices have been found to be difficult to manipulate, often involving complex connections and particularly, are difficult to release from the chain when, for example, the pitch of a series of catch pins (or pallets) on a chain needs to be changed. It is desirable also that the pallets as well as the catch pin devices be easily and efficiently mounted and dismounted from the chain.

It would be advantageous to provide an attachment device having means whereby a pallet may be easily and efficiently removed from the catch pin independently of the coupling between chain and catch pin. It is important that the device be stable, easily manipulatable and as well possess the common desirable characteristics of economy in manufacture, assembly and operation.

SUMMARY OF THE INVENTION

A pallet coupling device for a chain conveyor characterized in that it includes a block and a supporting pin journaled therein while being constrained axially. The block is rotatable about the pin. The pin is formed so as to be capable of being inserted into a hollow roller of a standard chain type conveyor and is free to rotate when so inserted. Means are provided on the block to enable a pallet removably to be detached thereto and an outwardly extending peg is provided for engagement with the chain. Means are provided for independently releasing the pallet from the block and the block from the chain.

DESCRIPTION OF THE PREFERRED EMBODIMENT

A device for attaching a pallet to a conveyor chain which is utilized in the wrapping machinery art is often referred to as a "catch pin." However, since the pallet coupling device provided by the invention may be used in other than the goods wrapping machinery art, the aforesaid invention will be referred to generically as a pallet coupling device. Obviously, other devices in lieu of pallets may be coupled to conveyor chain systems utilizing the coupling device according to the invention.

Figure 1:
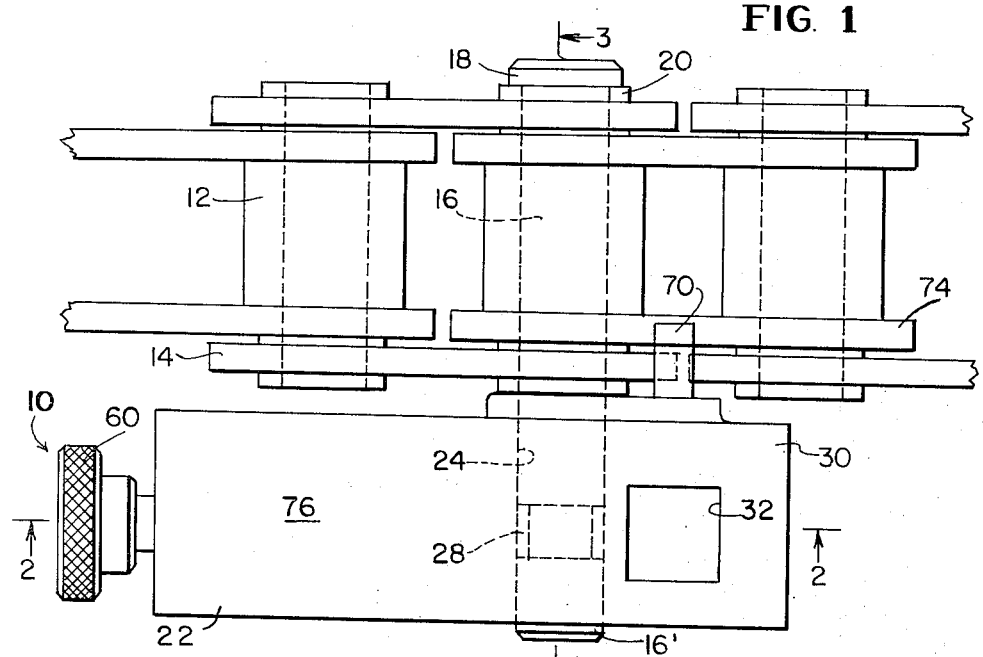
FIG. 1 is a plan view of the attachment device according to the invention illustrated as mounted upon the chain of a chain conveyor.
Figure 2:
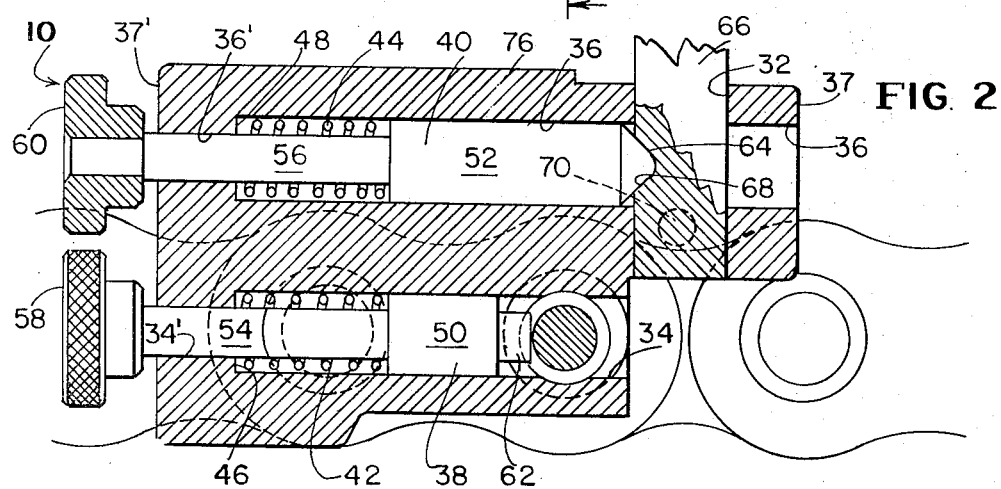
FIG. 2 is a sectional view taken along lines 2—2 of FIG. 1 and in the direction generally indicated.

Referring now to the drawings, in FIG. 1 the pallet coupling device according to the invention is generally designated by reference character 10 and is illustrated as mounted to a conventional driving chain having hollow rollers 12 linked at their sides by metal plates or links 14. A pin 16 is inserted axially into the hollow roller 12. The pin 16 is free to rotate in the roller 12 and is provided with a head 18 which rests on the riveted end 20 of the roller 12. The opposite end of the pin 16 protrudes from the roller 12. The protruding end 16' is received within the body 22 of the attachment device 10. The body 22 preferably is of a rectangular configuration and is provided a through passageway 24 for accommodating therewithin the protruding end 16' of the pin 16. The pine end 16' is provided with a recess 28 adjacent to its free end, said recess 28 being in the form of an annular groove. Above and to one side of the passageway 24, there is a rectangular projection 30 integral with the body 22. A polygonal passageway 32 of generally square cross section is formed in projection 30 and has its long axis oriented perpendicular to the long axis of passageway 24.

The body 22 of the device 10 is provided with a pair of parallel sockets 34 and 36 opening to that end 37 of the body 22 which is adjacent to the passageways 24 and 32. Sockets 34 and 36 intercept said passageways 24 and 32 respectively. Socket 34 is at the level of the pin 16 and the other socket 36 is substantially at the level of the center of the projection 30 of the body 22, intercepting passageway 32. Narrow diameter, passageways 34' and 36' respectively are coaxial with and link the inner ends of sockets 34 and 36 to the opposite end 37' of the body 22. A pair of spindles or plungers 38 and 40 are seated within the sockets 34 and 36 respectively. Compression springs 42 and 44 are seated between the respective floors 46, 48 of the sockets 34, 36 and the heads 50, 52 of the plungers 38, 40. Plunger rods 54 and 56 extend through passageways 34' and 36'. Manipulating or control knobs 58 and 60 are secured to the free ends of rods 54 and 56. The respective plungers are so biased to enable their free end, 62, 64 to intercept passageways 24 and 32 respectively.

Passageway 32 is adapted to receive the dog 66 of the pallet (not shown). Dog 66 has a circumferential recess 68 formed therein spaced from the free end thereof. So engaged, axial movement of the pin is prevented by plunger end 62 engaged in recess 28. When plunger end 64 is engaged in recess 68 axial movement of the peg or dog 66 relative to the body 22 is prevented. The pin 16 is left free to rotate in the corresponding axial passageway of the roller, the block or body being free to rotate on the pin 16. When the dog is engaged in passageway 32, the pallet as described rests firmly upon the upper surface of the body 22. As the result of the spring bias, the end 64 of the plunger 40 serves to fix the dog in position and consequently assures the retention of the pallet in proper position.

Projection means in the form of outwardly protruding peg 70 is provided on the body 22 and extends from the surface 72 facing the link of plate 79. The peg 70 is shown as resting on the upper edge of the plate 74 of the conveyor chain when the device 10 is installed so as to prevent rotation of the device 10 except to turn around so as to stabilize the pallet upon the top surface 76 of the body 22 so that when the chain is driven, the pallet is moved therewith.

The attachment device 10 described above is capable of being used in any required position on a chain without the need for recourse to any other mechanical aids. Apart from a reliable linkage, it is also practical since it requires little effort to move its position on the chain in relation to other similar devices in order to change the pitch or spacing of the devices on the chain.

Figure 3:
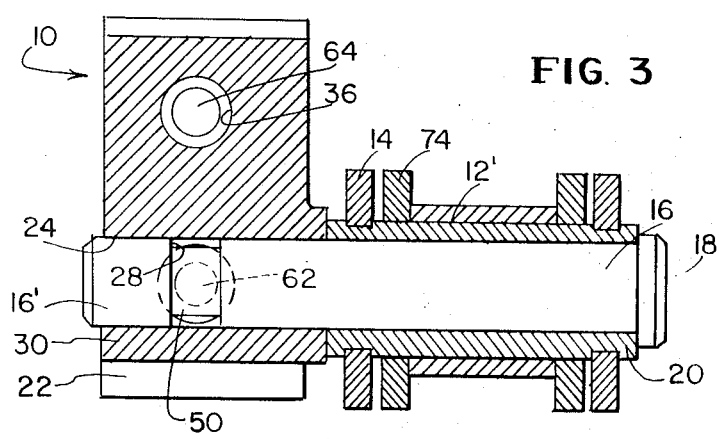
FIG. 3 is a sectional view taken along lines 3—3 of FIG. 1 and in the general direction indicated.

In fact, simply by moving the plunger 38 using the knob 58, the operator releases plunger end 62 from the annular groove 28 cut into the pin 16 and thereby enables the removal of the device 10. A similar operation is carried out in order to release the pallets, since by simply pulling the knob 60 of the plunger 40, the end 64 is released from the dog 66 and enables the dog 66 to be removed from the passage 32 so that a fresh pallet (not shown) can be attached. The pallet is locked in place simply by manipulation of the plunger 40. Since the pin 16 is able to rotate in the axial passageway of the roller and as well the body 22 can rotate relative to the pin 16, the block can rotate as necessary to assure effective operation as the chain moves in conveying manner. Since the device is displaced laterally in relation to the chain, the chain can be kept in a clean condition at all times. Of course, the roller arrangement 12 may be of the character shown in FIG. 3 or may vary therefrom. In FIG. 3, the roller pairs are mounted for rotation on sleeve 78 to which the plates 14 are mounted while the plates 74 link rollers 12 in pairs while plates 14 link roller pairs.

What I claim is:

1. A pallet coupling device for use in mounting a pallet to a conveyor chain of the type which includes hollow rollers arranged in side linked pairs, said coupling device comprising a block body, a support pin, first means carried by said body for rotatably seating one end of the said pin journaled therein and constrained against axial movement relative thereto, the other end of said support pin adapted to be received journaled for rotation within said hollow roller, second means carried by said body for releasably receiving pallet support means therein, and third means carried by the body for engaging one side of the link roller pair.

2. The pallet coupling device as claimed in claim 1 in which said first and second means comprise respectively first and second passageways formed in said body, the first passageway accommodating said one end of the support pin therein and the second passageway being offset from the first passageway and having its long axis normal to the long axis of the first passageway and resilient restraining means seated within said body in intercepting relation with said first and second passageways respectively, said resilient restraining means being engagable with said one pin end and said pallet support member respectively.

3. The pallet coupling device as claimed in claim 1 in which said third means is a peg projecting from the body to engage one side of said side linked pairs of the hollow rollers.

4. The pallet coupling device as claimed in claim 2 in which said first passageway is of size and configuration to receive said one end of said pin therein, said pin end having recess means for engagement with said resilient restraining means.

5. The pallet coupling device as claimed in claim 2 in which said second passageway is of size and configuration to receive said pallet support means therein.

6. The pallet coupling device as claimed in claim 1 in which said pallet support means comprises a depending dog formed on a pallet, said dog including recess means for engagement with said resilient restraining means.

7. The pallet coupling device as claimed in claim 2 in which are provided a pair of parallel sockets formed in said body opening in intercepting relation with said respective first and second passageways, and said resilient restraining means comprises spring biased plunger means seated within each of said sockets and having plunger end portions disposed biased in intercepting relationship with said first and second passageways respectively.

8. The pallet coupling device as claimed in claim 7 in which the resilient restraining means are independently operable spring biased plungers respectively seated in said sockets.

9. The pallet coupling device as claimed in claim 2 in which the second passageway has a substantially rectangular cross section.

10. The pallet coupling device as claimed in claim 7 in which the control knob means provided on the exterior ends of said plunger means for independent manipulation thereof.

11. A coupling device for use in connecting a chain having a hollow roller to a pallet, comprising a block portion and a supporting pin, means on said block portion for rotatably mounting said block portion upon said pin and means constraining said block portion against axial movement relative said pin, said pin also being insertable for free rotation in the hollow roller of the chain, means on the block for removably attaching a pallet to said block and a projection on said block having an outwardly extending projection engageable with the chain.

12. A coupling device as claimed in claim 11 in which said pin has a head at one end thereof and said constraining means comprises groove means formed in said pin at the opposite end and a resiliently biased spindle slidably located in the block, the axis of the spindle being perpendicular to the axis of the pin and means for biasing said spindle with one end in engagement with said groove means.

13. A coupling device as claimed in claim 12 and a control knob secured to said spindle at the end thereof opposite to that engaging the groove.

14. A coupling device as claimed in claim 11 in which said pallet attaching means comprise a passageway of polygonal configuration formed in the block portion and opening to the upper surface thereof and the pallet has a dog depending therefrom, the dog being insertable into the said passageway and a second resiliently biased spindle slidably located in said spindle having one end in said block, engageable with the dog.

15. A coupling device as claimed in claim 14 in which the second spindle is provided with a second control knob secured to the second spindle at the end thereof opposite to said one end which engages the dog.

* * * * *